(12) United States Patent
Zechlin et al.

(10) Patent No.: US 7,483,677 B2
(45) Date of Patent: Jan. 27, 2009

(54) RESCUE BEACON

(75) Inventors: Christian Zechlin, Herne (DE);
Thomas Block, Wuppertal (DE)

(73) Assignee: Nokia Corporation, Espoo (FI)

( * ) Notice: Subject to any disclaimer, the term of this patent is extended or adjusted under 35 U.S.C. 154(b) by 306 days.

(21) Appl. No.: 10/501,249

(22) PCT Filed: Jan. 15, 2002

(86) PCT No.: PCT/EP02/00639

§ 371 (c)(1),
(2), (4) Date: Jan. 31, 2005

(87) PCT Pub. No.: WO03/061215

PCT Pub. Date: Jul. 24, 2003

(65) Prior Publication Data

US 2005/0118950 A1 Jun. 2, 2005

(51) Int. Cl.
*H04B 1/38* (2006.01)
(52) U.S. Cl. .................. 455/73; 455/11.1; 455/41.2
(58) Field of Classification Search .............. 455/41.2, 455/73, 90.2, 1, 11.1; 370/310, 324, 350
See application file for complete search history.

(56) References Cited

U.S. PATENT DOCUMENTS

| 5,517,499 | A | * | 5/1996 | Gauffin et al. | 375/356 |
| 5,872,820 | A | * | 2/1999 | Upadrasta | 375/356 |
| 6,959,013 | B1 | * | 10/2005 | Muller et al. | 370/512 |

FOREIGN PATENT DOCUMENTS

| WO | WO 99/37106 | * | 7/1999 |
| WO | WO-99/37106 A1 | | 7/1999 |
| WO | WO 02/01811 | * | 1/2002 |
| WO | WO-02/01811 A2 | | 1/2002 |

OTHER PUBLICATIONS

Bluetooth Specification Version 1.0 B; "Channel Control"; XP002937254; Nov. 29, 1999; pp. 95-126.

* cited by examiner

*Primary Examiner*—Nay A Maung
*Assistant Examiner*—Tuan H Nguyen
(74) *Attorney, Agent, or Firm*—Harrington & Smith PC

(57) ABSTRACT

A low power radio frequency transceiver is arranged to form a network of communicating low power radio frequency transceivers. It comprises a transmitter for transmitting packets of data and means for controlling the transmitter to transmit a series of messages of a first type outside the network of transceivers, for maintaining synchronisation.

29 Claims, 4 Drawing Sheets

| | N | | N+1 | | N+2 | | N+3 | | N+4 | | N+5 |
|---|---|---|---|---|---|---|---|---|---|---|---|

| Tx(ID) | Tx(ID) | Rx(ID) | Rx(ID) | Tx(ID) | Tx(ID) | Rx(ID) | Rx(ID) | Tx(ID) | Tx(ID) | Rx(ID) |
|---|---|---|---|---|---|---|---|---|---|---| f(k)   f(k+1)         f(k+2)  f(k+3)         f(k+4)  f(k+5)

Figure 5a

| | N | | N+1 | | N+2 | | N+3 | | N+4 | | N+5 |
|---|---|---|---|---|---|---|---|---|---|---|---|

| Tx(ID) | Tx(ID) | Rx(ID) | Rx(ID) | Tx(NULL) | Rx(ID) | Rx(ID) | Tx(ID) | Tx(ID) | Rx(ID) |
|---|---|---|---|---|---|---|---|---|---| f(k)   f(k+1)         g(m)                f(k+4)

Figure 5b

RESCUE BEACON

FIELD OF THE INVENTION

The present invention relates to a low power radio frequency transceiver arranged to form a radio network of communicating low power radio frequency transceivers. In particular, it relates to a Bluetooth master transceiver which is adapted to prevent connected slave transceivers losing synchronisation while the master transceiver conducts an inquiry procedure or a paging procedure.

BACKGROUND OF THE INVENTION

FIG. 1 illustrates a network (Bluetooth piconet) 2 of radio transceiver units, including a master unit 4 and slave units 6, 8 and 10, communicating by transmitting and receiving radio packets. The master unit is the transceiver unit which initiates the connection of a slave to the network. There is only one master in a network. The network operates in a time division duplex fashion.

The transceivers transmit and receive, in this example, in a microwave frequency band, illustratively 2.4 GHz. The network reduces interference by changing the frequency at which each radio packet is transmitted. A number of separate frequency channels are assigned each with a bandwidth of 1 MHz, and the frequency may hop at a rate of 1600 hops/s.

Referring to FIG. 2, a frame 20 is illustrated. This frame 20 is the time frame used by the master unit 4. The frame illustratively has slots 22 to 29 of equal length. The slots designated by even numbers are reserved. Only the master unit can begin transmitting a radio packet aligned with the start of the even numbered slots. The slots designated by odd numbers are reserved. Only radio packets transmitted by a slave, that is, radio packets addressed for reception by the master unit can have their start aligned with the start of the odd numbered slots. Each slot is allocated a different one of a sequence of hopping frequencies. It is however, possible for a radio packet to extend over a number of slots and in this case the frequency at which the packet is transmitted remains constant at that allocated to the slot at the start of the packet. A slot has a constant time period and is typically 625 microseconds.

The network is a radio frequency network suitable for transmitting voice information or data information between transceivers. The transmissions made are of low power, for example 0 to 20 dBm, and the transceiver units can effectively communicate over the range of a few centimeters to a few tens or hundred of meters. The master unit has the burden of identifying the other transceiver units within its transmission range which is achieved using an Inquiry Procedure, and the burden of paging a transceiver unit to set up a communication link between the master unit and that slave unit which is achieved using an Access Procedure.

Referring to FIG. 3, a typical radio packet 30 is illustrated. The radio packet has a start 32 and contains three distinct portions: a first preamble portion contains an Access Code 34, a second portion contains a Header 36 and a third portion contains a Payload 38.

The Access Code is a series of bits used in the network to identify the start of a radio packet and effect synchronisation and DC estimation. It has a fixed length. In the receiver a sliding correlator correlates against a synchronisation word in the Access Code and triggers when a threshold is exceeded. There are three types of Access Codes. The Channel Access Code is derived from the Bluetooth Device Address (BD_ADDR) of the master unit and identifies a piconet. It is included in all packets communicated in the piconet channel. The Device Access Code is derived from the destination unit's Bluetooth Device Address (BD_ADDR) and signals the destination device e.g. during the Access Procedure. The Inquiry Access Code is used to discover which Bluetooth units are within range.

The header 36 may or may not be present. If present, it has a fixed length (e.g. 54 bits). The header contains control words. The active member address (AM_ADDR) is a word uniquely identifying a slave within a network. The active member address is assigned to a slave unit by the master unit when the master unit joins the slave to the network. The all zero AM_ADDR is reserved for broadcast purposes.

The payload 38 carries either transceiver control information or voice/data information. The payload is of variable length and may be absent. It may not exceed a maximum size e.g. 2745 bits.

The inquiry procedure enables a unit to discover which units are within range, and what their device addresses (BD_ADDR) and clock values are. The discovering unit transmits an inquiry message (ID packet) at different hop frequencies. The ID packet has no header or payload. Two ID packets are transmitted in each slot. The packet has the Inquiry Access Code as its Access Code and the hop frequencies used are determined from the Inquiry Access Code and is different for each packet transmitted.

The Access Procedure is a paging procedure which sets up a connection. The unit carrying out this procedure becomes the master of the piconet. The master repeatedly transmits the slave's device access code in different hop channels. An ID packet is transmitted which has no header or payload and has the destination DAC as its Access Code. A train of identical ID packets (two per slot) are transmitted each at different hop frequencies (see FIGS. 10.6 & 10.7 of the Bluetooth Baseband Specification v1.0B, 29 Nov. 1999). The master listens for a response after each transmission slot. The frequency hopping sequence is determined from the slave's Bluetooth Address (BD_ADDR). The master uses the value of the slave's clock received during an Inquiry Procedure to estimate the correct phase of the sequence.

In the Connection State, the connection between the master unit and slave unit has been established and packets can be sent back and forth. The packets use as the Access Code, the same channel access code (derived from Bluetooth device address BD_ADDR of the master unit supplied during the Access Procedure) and the same frequency hopping sequence, the channel hopping sequence (derived from Bluetooth device address BD_DDR of the master unit supplied during Access Procedure).

The transceiver units are synchronised to a common time frame determined by the master unit 4 and described in relation to FIG. 2. The clock of the master unit and the clock of the slave unit are temporarily synchronised, intermittently. An offset is added to the slave's native clock so that it corresponds to the master clock. However, the master and slave clocks drift apart. The synchronisation between the master and slave clocks is maintained on the receipt of each packet by the slave. Each slave has a sliding correlator which is set to identify the synchronisation word within the Channel Access Code. When the correlator reaches a threshold value a trigger signal is produced which allows the offset used by the slave clock to be adjusted so that synchronisation with the master clock is maintained. A periodic master transmission is required to keep the slaves synchronised to the master. Since the slaves only need the channel access code to synchronise with, any suitable packet can be used.

The frequency at which each radio packet is transmitted is determined from the channel hopping sequence using the time of transmission according to the master clock. The transmission frequency changes (hops) every 625 microseconds.

When the master unit is performing point-to-point communication (Connection State-Active Mode) a transmitted radio packet is addressed to a particular transceiver which replies to the master unit by transmitting a radio packet in the next available time slot.

Referring to FIG. 4, a schematic illustration of a transceiver unit is shown. Only as many functional blocks and interconnections are shown in this diagram as are necessary to explain in the following how a transceiver unit and the communication network operates. The transceiver unit 40 contains a number of functional elements including: an antenna 46, receiver 50, synchroniser 52, header decoder 54, controller 60, memory 56 having memory portion 58 storing the transceiver unit's BD_ADDR, packetiser 42, clock 68, frequency hop controller 48 and transmitter 44. Although these elements are shown as separate elements they may in fact be integrated together and may be carried out in software or in hardware.

Data to be transmitted in the payload of a packet by the transceiver unit 40 is supplied as data signal 41 to the packetiser 42. Control information to be transmitted in the payload of a packet is supplied in a payload control signal 89 provided by the controller 60 to the packetiser 42. The packetiser 42 also receives an access code control signal 69 and a header control signal 71 from controller 60 which respectively control the Access Code 34 and the Header 36 attached to the payload to form the packet 30. The packetiser 42 places the data or control information into a packet 30 which is supplied as signal 43 to the transmitter 44. The transmitter 44 modulates a carrier wave in dependence upon the signal 43 to produce the transmitted signal 45 supplied to the antenna 46 for transmission. The frequency of the carrier wave is controlled to be one of a sequence of hop frequencies by a transmission frequency control signal 47 supplied by the frequency hop controller 48 to the transmitter 44.

The antenna 46 receives a radio signal 51 and supplies it to the receiver 50 which demodulates the radio signal 51 under the control of a reception frequency control signal 49 supplied by the frequency hopping controller 48 to produce a digital signal 53. The digital signal 53 is supplied to the synchroniser 52 which synchronises the transceiver unit 40 to the time frame of the network. The synchroniser is supplied with an access code signal 81 specifying the Access Code of the packet which the transceiver unit is expecting to receive. The synchroniser accepts those received radio packets with Access Codes which correspond to the expected Access Codes and rejects those received radio packets with Access Codes that do not correspond to the expected Access Code. A sliding correlation is used to identify the presence and the start of the expected Access Code in a radio packet. If the radio packet is accepted then the radio packet is supplied to the header decoder 54 as signal 55 and a trigger signal 79 is returned to the controller 60 indicating that the packet has been accepted by the synchroniser 52. The trigger signal 79 is used by the controller, in a slave unit, to synchronise to the master clock. The controller compares the time at which a radio packet was received with the time at which the radio packet was expected to be received and shifts its timing to offset the difference. Such an offset may be achieved by varying the value of an offset stored in memory 56 by the value of the difference. The header decoder 54 decodes the header in the received packet and supplies it to the controller 60 as header signal 75. The header decoder 54, when enabled by a payload acceptance signal 77 supplied by the controller 60, produces a data output signal 57 containing the remainder of the radio packet, the payload 38.

The frequency-hopping controller 48 cycles through a sequence of frequencies. The transmission frequency control signal 47 and the reception frequency control signal 49 normally alternately control the transmitter 44 and the receiver 50. When the transceiver 40 is acting as a master, the receiver 50 is normally capable of receiving at frequencies determined by the odd values of the sequence and the transmitter is normally capable of transmitting at frequencies determined by the even values of the sequence. When the transceiver is acting as a slave unit the reverse is true. The frequency-hopping controller 48 receives the access code control signal 69 (also supplied to the packetiser 42) and an offset signal 67 from the controller 60 and a clock signal 59, which represents the time held in clock 68, from the clock 68. The offset signal 67 defines the value of an offset from the time held in the clock 68. This value may be null. The frequency-hopping controller combines the clock signal 59 and the offset signal 67 to emulate the time held in a clock offset by the value of the offset signal 67 from the clock 68. The sequence of frequencies through which the hopping controller 48 cycles is dependent upon the access code control signal 69. The position within the cycle is dependent upon the emulated time. When the access code control signal 69 provides the Channel Access Code the channel hopping sequence is defined. When the access code control signal 69 provides the device access code or the inquiry access code different hopping sequences are defined.

The memory 56 has a portion 58 which permanently stores the BD_ADDR of the transceiver unit 40. The remaining portion of the memory 56 can be written to by the controller 60. If the transceiver unit 40 is functioning as a slave unit, the memory 56 will additionally store the BD_ADDR of the master unit, an offset value representing the difference between the slave unit's clock and the master unit's clock and the slave's address in the network, AM_ADDR. If the transceiver unit 40 is functioning as a master unit, the memory 56 will additionally store for each slave unit participating in the network: the BD_ADDR; an offset value representing the difference between the master unit's clock and that particular slave unit's clock and AM_ADDR uniquely identifying the particular slave unit in the network.

The Bluetooth Specification, revision 1.1, states the following about Bluetooth slave synchronisation:

"The slave's RX timing is based on the latest successful trigger during a master-to-slave slot. [ . . . ] The slave shall be able to receive the packets and adjust the RX timing as long as the timing mismatch remains within the ±10 µs uncertainty window."

Consequently Bluetooth Module manufacturers have designed their Bluetooth devices such that they are using a static ±10 µs uncertainty window for every Reception. This means that if a master is transmitting more than 10 µs earlier or more than 10 µs later than the slave is expecting, the slave will not be able to receive this packet and will not be able to adjust its clock/its timing to the received packet. Since both master and slave transceivers are using different native clocks that are allowed to drift around ±20 ppm, such a Bluetooth slave may (in worst case) lose connection when not having received a packet from the master within a time $t_{conloss}$ that can be calculated as follows:

$$t_{conloss} = \frac{10 * 10^{-6} \text{ s}}{(20+20) * 10^{-6}} = 250 \text{ ms}$$

During a normal active connection between master and slave, this time is never reached since the master has to poll the slave within $T_{Poll}$, that is 25 ms by default. However, if the master is connected to one or several slaves and tries to discover/connect to other Bluetooth devices by doing Inquiry or Page, this continuous polling is interrupted for the time Inquiry or Page is done, typically for 5-10 s. As a consequence, it is very likely that all slaves that are connected to a piconet, will lose connection as soon as the master is starting Inquiry or Page.

One possible solution to avoid the Connection Loss is to set all active connections into Bluetooth Hold Mode prior to starting Page or Inquiry. Hold Mode means that the master tells each slave that it will stop polling for a fixed time (up to 40 s). During this time, the master can do the required Inquiry or Paging. After expiry of the fixed time, the master will restart polling of all slaves. In contrast to the normal connected mode, Hold Mode defines that a slave shall, at the end of the Hold Mode, restart reception with a much larger Uncertainty Window that can even be several milliseconds, if needed. So Hold Mode is able to avoid the Connection Loss.

There are several disadvantages when using Bluetooth Hold Mode on the master side for avoiding the Connection Loss Problem:

1) The Bluetooth Specification does not mandate hold Mode, so it is just an optional feature. This means that a connection loss cannot be avoided in every case, because each slave that is connected to the master and does not support Hold Mode will lose the connection.
2) In case there are several slaves connected to the master, the procedure to set all connections to all slaves into Hold Mode is quite complicated, since the setting into Hold Mode has to be done for each slave successively. This results in a waste of air capacity.
3) Both Inquiry and Page are procedures that are not necessarily fixed in length. The length of the Inquiry Procedure has a fixed maximum value, but may
4) depend on the number of responses returned from found devices (so Inquiry may last much shorter than the maximum length). The length of the Page Procedure has a fixed maximum value, but it depends on the Bluetooth Clock Value of the device to be paged and depends on the distortion on the air interface (the worse the distortions are, the longer Paging may take). As a consequence, the length of the Hold Mode has to be selected such that it is more than the maximum length of Inquiry/Page. In the cases where Inquiry/Page takes less than this maximum time, the master still has to wait until the end of Hold mode before restarting to poll the connected slaves. This results in a waste of air capacity.

It would therefore be desirable to improve the Inquiry/Paging procedure of a Bluetooth device by preventing connected slaves losing synchronisation without suffering the disadvantages associated with the Hold Mode.

SUMMARY OF THE INVENTION

Embodiments of the invention avoid the use of Hold Mode (and all disadvantages described above) by still polling all slaves even while doing Inquiry or Page. One might perceive the invention as disadvantageous because the polling during Page or Inquiry disturbs the Inquiry and Page, thus leading to a longer time until a device is found during Inquiry/longer time until a device gets connected when paging. However, the inventors realised that even if this negative effect exists in theory, it has no real consequences for the users, since the differences between Inquiry/Page with and without using the invention are of statistical nature (one percent of all Inquiries/Pages need longer) and are not visible at all to a user.

According to a first aspect of the present invention there is provided a low power radio frequency transceiver as claimed in claim 1.

According to a second aspect of the present invention there is provided a method of maintaining synchronisation in a network of communicating low power radio frequency transceivers as claimed in claim 10.

According to a still further aspect of the present invention there is provided a storage medium, for data as claimed in claim 11. Embodiments of the present invention relate to the adaptation of the existing Inquiry and paging procedures as defined in the Bluetooth specification 1.1B and it may consequently be implemented by the adaptation of the existing low power radio frequency transceivers. As the existing low power radio frequency transceivers are primarily software controlled, they may be adapted by updating the controlling software using computer code stored on a storage medium as claimed in claim 11. The storage medium could for example be a floppy disc, a CD-ROM, a DVD, a semiconductor memory, or any computer program product that permanently or transiently stores data.

BRIEF DESCRIPTION OF THE DRAWINGS

For a better understanding of the present invention and to understand how the same may be brought into effect reference is made by way of example only to the following figures:

FIGS. 5a and 5b illustrate the modification made to the paging procedure in accordance with an embodiment of the present invention.

DETAILED DESCRIPTION OF THE INVENTION

Figure 1:
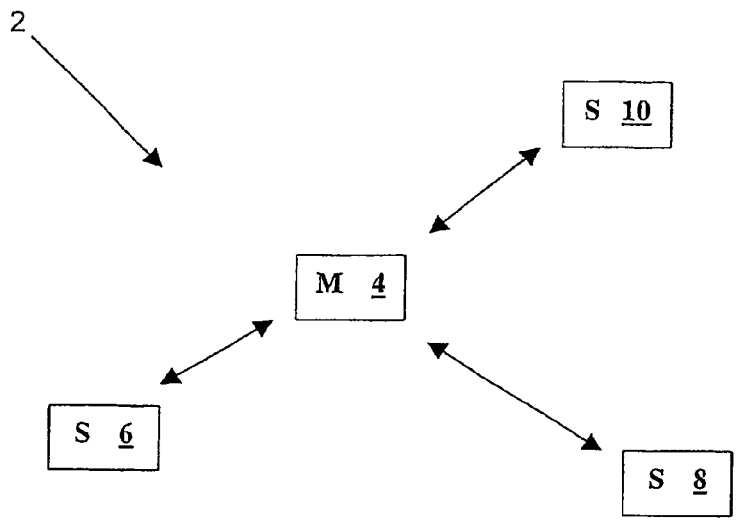
FIG. 1 illustrates a radio network.
Figure 2:
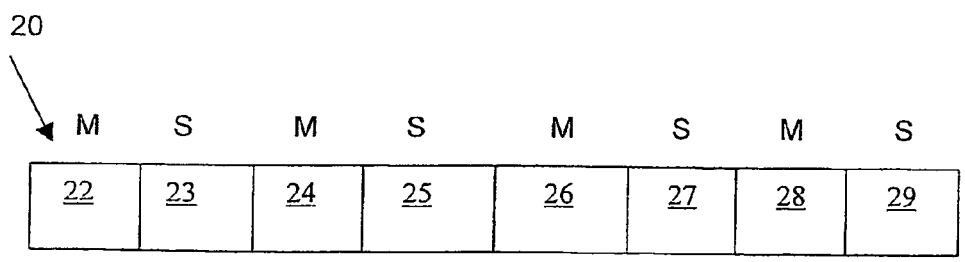
FIG. 2 illustrates the timing of packet transmission and reception in the network.
Figure 3:
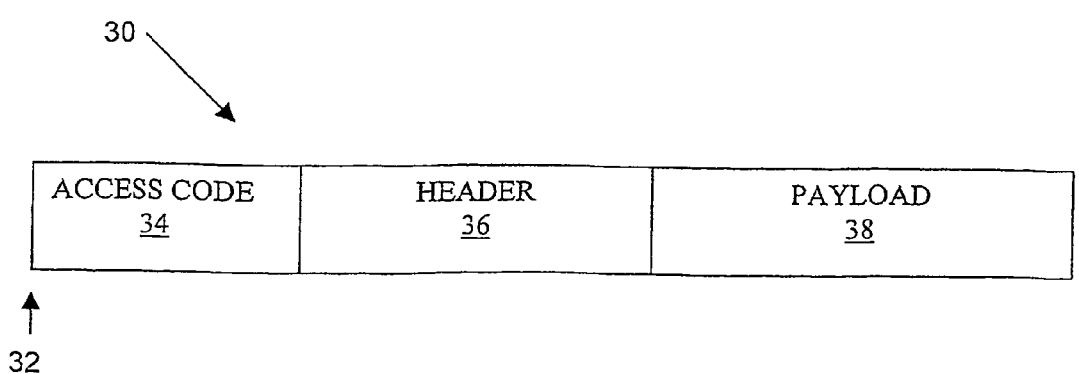
FIG. 3 illustrates a packet transmitted in the network.

The present invention relates to an improvement of a Bluetooth transceiver when operating as master. The master continues to poll all connected slaves even while doing Inquiry or Page.

In order not to disturb Inquiry/Page too much, a special type of polling is used that 0) does not depend on $T_{Poll}$ (Polling shall be done as rarely as possible, just for holding the slaves)
0) uses only short single slot packets
0) reaches all connected slaves with only one packet
0) does not allow a polled slave to return a packet in the following slave-to-master slot.

Doing this, the special polling (named "Rescue Beacon") consumes as little air capacity as possible.

For the Rescue Beacon, the following has been selected:
1) Polling is done every 125 ms (not depending on $T_{Poll}$)
2) Bluetooth NULL packets are used. They consume only one Bluetooth slot (625 µs). It is also possible to use ID packets (consuming only a 312.5 µs half slot), however, some manufacturers do not synchronize their slaves only to a received Bluetooth Access Code, but also require a valid Packet Header. Only if a valid packet header is received, can they synchronize their slave clock to the received packet. So a NULL packet is the better solution.

3) In addition, the AM_ADDR field in the packet header is set to 000 binary, meaning that this packet is a Broadcast Packet that addresses all slaves at once.
4) The Bluetooth Specification forbids slaves to answer to a Bluetooth NULL packet.

A NULL packet as defined in Bluetooth Specification version 1.0B, is a packet which has no payload and therefore consists of the channel access code and packet header only, its total (fixed) length is 126 bits the NULL packet itself does not have to be acknowledged.

Rescue Beacon Implementation for Paging

FIG. 5a illustrates the operation of a Bluetooth device acting as master of a piconet while performing a paging procedure. The master transmits and receives in alternate slots. It transmits in slots N, N+2, N+4 ... and receives in slots N+1, N+3, N+5 ... In the paging procedure, the master transmits two ID packets per slot. The ID packet has as its access code the paged slave's device access code (DAC) and it does not have a header or payload. The frequencies at which an ID packet is transmitted is dependent upon a frequency hopping sequence determined from the paged slave's Bluetooth address (BD_ADDR). This frequency hopping sequence is f(k), f(k+1), f(k+2), f(k+3), f(k+4), f(k+5) ... In the slot N, the first ID packet is transmitted at a frequency f(k) and the second ID packet in the slot N is transmitted at a frequency f(k+1).

FIG. 5b, illustrates how the paging procedure is adapted in accordance with an embodiment of the present invention. The slot N+2 is now occupied by a rescue beacon. This rescue beacon replaces the two ID packets which would have been transmitted in slot N+2 in the absence of the present invention. The paging sequence is otherwise unaffected. The rescue beacon is a NULL packet according to the preferred embodiment of the present invention (a less desirable alternative would be an ID packet). The frequency at which the rescue beacon is transmitted is determined in accordance with the channel hopping sequence which is dependent upon the Bluetooth device address (BD_ADDR) of the master transceiver and the phase within the sequence determined by the master clock. The channel frequency hopping sequence may be defined as g(i) where i is an integer. In the example of FIG. 5b, at slot N+2 the phase of the Bluetooth clock is given by m and consequently the frequency at which the rescue beacon is transmitted is represented by g(m). The NULL packet has as its access code, the channel access code which is derived from the Bluetooth device address of the master unit and has a packet header which indicates that the packet is a broadcast beacon (i.e. AM_ADDR is set to 000 binary).

In the example of FIG. 5b, the N+2 slot contains a rescue beacon because it is 125 ms since the beginning of the page procedure or 125 ms since the last transmission of a rescue beacon. It should therefore be appreciated that in slot N+X which is 125 ms after slot N+2, another rescue beacon will be transmitted. This rescue beacon will be a NULL packet identical to the preceding rescue beacon but will have a different frequency of transmission selected from the same channel hopping sequence but determined by the phase of the Bluetooth master clock at the time of transmission Apart from the punctuation of the train of paging messages by the replacement of a pair of ID packets with a rescue beacon every 125 ms, the paging process is otherwise unaffected.

Figure 4:
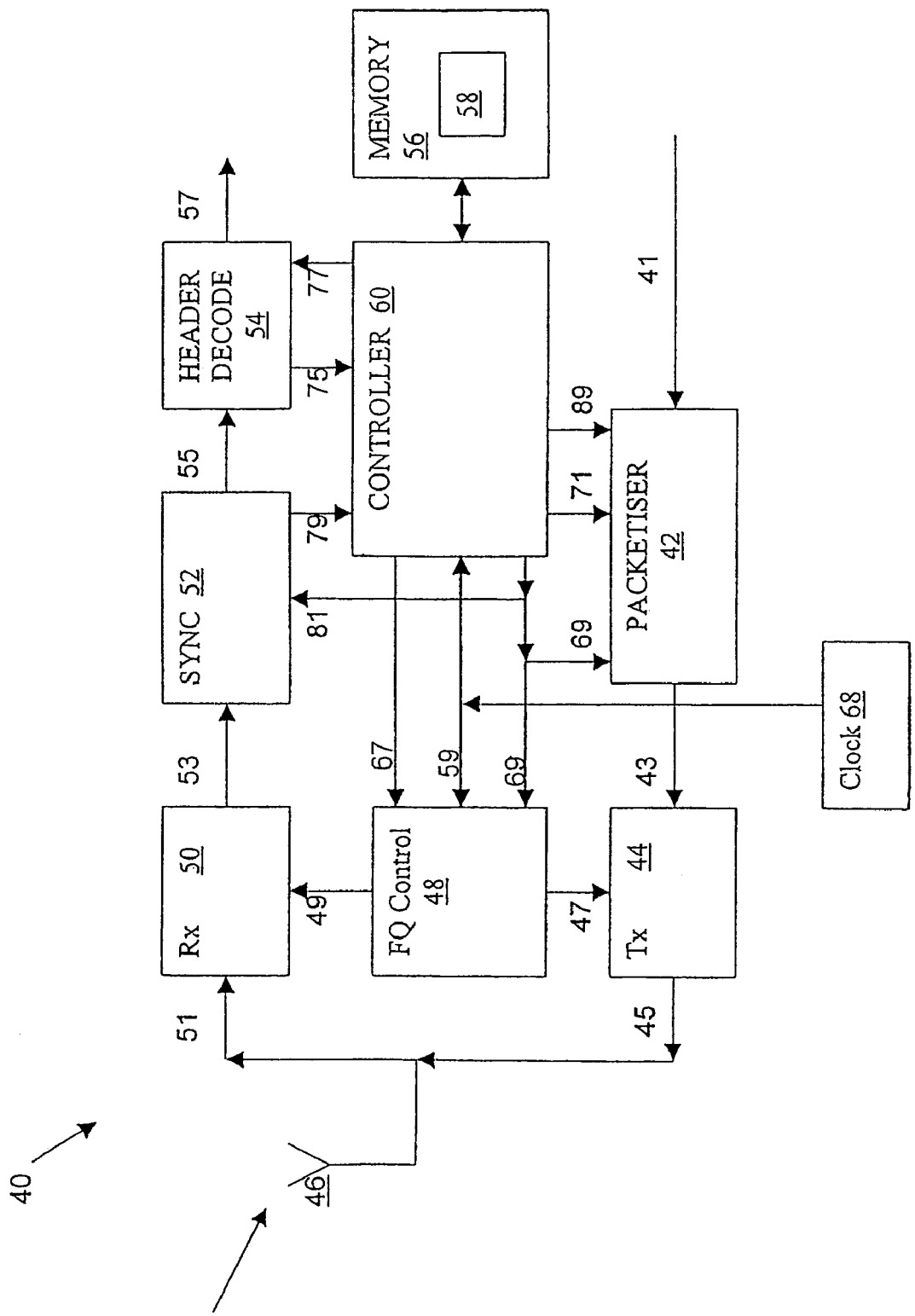
FIG. 4 illustrates a transceiver unit in more detail.

Referring to FIG. 4, according to an embodiment of the invention, the controller 60 is adapted to insert the rescue beacon (NULL packet with channel access code at the correct channel hopping frequency) at the correct time. The controller uses the header control signal 71 to insert the correct broadcast address into the header of the NULL packet and the access code control signal 69 provides the channel access code as the access code of the NULL packet. The access code control signal 69 is therefore changed from the device access code of the paged slave to the channel access code when the train of paging messages is to be punctuated by a rescue beacon. This change in the access code control signal 69 also affects a change in the hopping frequency sequence used. The frequency controller 48 will therefore switch to using the channel hopping sequence. The phase within the sequence is determined by the clock signal 59 from clock 68 without an offset being used.

In a preferred embodiment, a rescue beacon is sent 125 ms after the start of the paging procedure and then once every 125 ms thereafter during the paging procedure.

If a Bluetooth device is not a master of a network, that is there are not already existing slave transceivers, the device will not implement the present invention when doing the paging procedure as there are no connected slaves.

Rescue Beacon Implementation for Inquiry

Figure 6A:
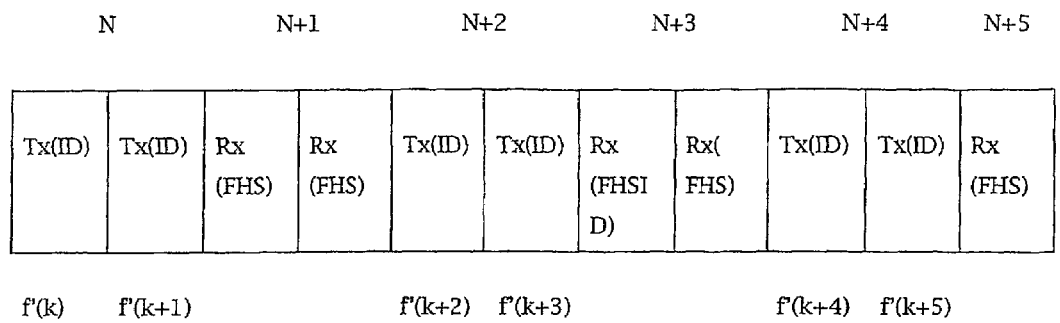
FIGS. 6a and 6b illustrate a modification made to the inquiry procedure in accordance with an embodiment of the present invention.

FIG. 6a illustrates the operation of a master transceiver when it is doing an inquiry procedure. It will be observed that the procedure is very similar to the paging procedure. A difference is that the ID packets used have different access codes and in that the channel hopping sequence used is different as represented by the hopping sequence f'(k), f'(k+1). Another difference is that the device expects FHS packets to be received instead of ID packets The following description of the Bluetooth FHS packet is taken from the "Specification of the Bluetooth system, Version 1.1; 22, Feb. 2001; section 4.4.1.4:" The FHS packet is a special control packet revealing, among other things, the Bluetooth device address and the clock of the sender. The payload contains 144 information bits plus a 16-bit CRC code. The payload is coded with a rate 2/3 FEC which brings the gross payload length to 240 bits. The FHS packet covers a single time slot.

The FHS packet is usually used in page master response, inquiry response and in master slave switch. In page master response or master slave switch, it is retransmitted until its reception is acknowledged or a time out has exceeded. In inquiry response, the FHS packet is not acknowledged. The FHS packet contains real time clock information. This clock information is updated before each retransmission. The retransmission of the FHS payload is thus somewhat different from the retransmission of ordinary data payloads where the same payload is used for each retransmission. The FHS packet is used for frequency hop synchronization before the piconet channel has been established, or when an existing piconet changes to a new piconet. In the former case, the recipient has not been assigned an active member address yet, in which case AM_ADDR field in the FHS packet header is set to all-zeroes; however, the FHS packet should not be considered as broadcast packe. In the latter case the slave already has an AM_ADDR in the existing piconet, which is then used in the FHS packet header."

Figure 6B:
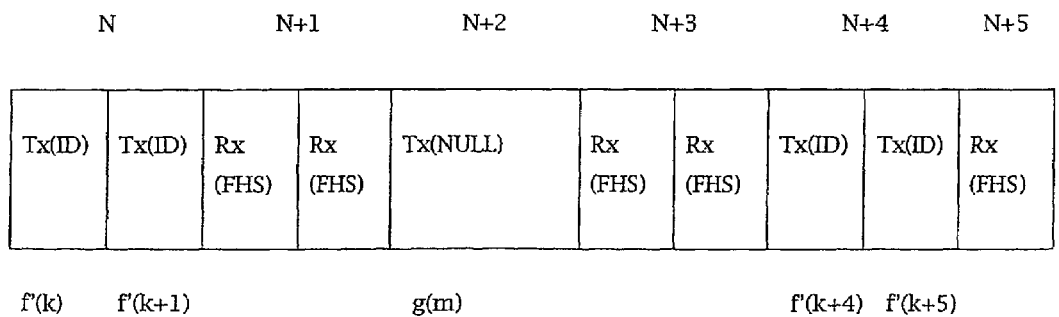

FIG. 6b illustrates how an embodiment of the present invention may be implemented during the inquiry mode.

The train of ID packets transmitted in the inquiry procedure is punctuated in the same manner as in the paging procedure as illustrated in FIG. 6b. The procedure for punctuation is identical to that described in relation to FIG. 5b. The slot N+2 is now occupied by a rescue beacon. This rescue beacon replaces the two ID packets which would have been transmitted in slot N+2 in the absence of the present invention. The inquiry sequence is otherwise unaffected. The rescue beacon is a NULL packet according to the preferred embodiment of the present invention (a less desirable alternative would be an ID packet). The frequency at which the rescue beacon is transmitted is determined in accordance with the channel hopping sequence which is dependent upon the Bluetooth device address (BD_ADDR) of the master transceiver and the phase within the sequence determined by the master clock.

Although the present invention has been described in the preceding paragraphs with reference to various examples, it should be appreciated that modifications and variations to the examples given can be made without departing from the scope of the invention as claimed.

The invention claimed is:

1. An apparatus comprising:
   means for controlling a transmitter to transmit a series of messages of a first type outside a network of low power radio frequency transceivers, the apparatus being configured to form the network of transceivers,
   means for punctuating the series of messages of a first type with messages of a second type, transmitted within the network of transceivers, for maintaining synchronization.

2. The apparatus as claimed in claim 1 arranged to operate as a master of the radio network of slave transceivers.

3. The apparatus as claimed in claim 1 wherein the network of transceivers uses a first frequency hopping sequence.

4. The apparatus as claimed in claim 3 wherein the messages of a first type transmitted outside the network of transceivers are transmitted using a second frequency hopping sequence.

5. The apparatus as claimed in claim 1 wherein the messages of the second type are broadcast.

6. The apparatus as claimed in claim 1 wherein the means for punctuating, punctuates the series of messages of a first type with a message of a second type periodically.

7. The apparatus as claimed in claim 1 wherein the messages of the second type do not initiate a response from any of the transceivers in the network.

8. The apparatus as claimed in claim 1 wherein the messages of the second type comprise a synchronization word dependent upon the identity of the apparatus.

9. The apparatus as claimed in claim 1 wherein messages of the second type are transmitted at a frequency dependent upon the identity of the apparatus.

10. A method comprising:
    punctuating a series of messages of a first type transmitted by a master transceiver outside a network of low power radio frequency transceivers, the network of transceivers comprising the master transceiver and at least one slave transceiver, with messages of a second type transmitted within the network of communicating transceivers for maintaining synchronization.

11. A method as claimed in claim 10, wherein the network of transceivers uses a first frequency hopping sequence.

12. A method as claimed in claim 11, wherein the messages of a first type transmitted outside the network of transceivers are transmitted using a second frequency hopping sequence.

13. A method as claimed in claim 10, wherein the messages of the second type are broadcast.

14. A method as claimed in claim 10, wherein the series of messages of a first type are punctuated with a message of a second type periodically.

15. A method as claimed in claim 10, wherein the messages of the second type do not initiate a response from any of the transceivers in the network.

16. A method as claimed in claim 10, wherein the messages of the second type comprise a synchronization word dependent upon the identity of the transmitting low power radio frequency transceiver.

17. A method as claimed in claim 10, wherein messages of the second type are transmitted at a frequency dependent upon the identity of the transmitting low power radio frequency transceiver.

18. A computer program product comprising program instructions for causing a computer to perform the method of claim 10.

19. A storage medium encoded with instructions that, when executed by a controller of a low power radio frequency transceiver perform punctuating transmission of a series of messages of a first type comprising a first synchronization word independent of the identity of the low power radio frequency transceiver, with messages of a second type comprising a second synchronization word dependent upon the identity of the low power radio frequency transceiver.

20. A storage medium as claimed in claim 19, wherein the punctuating punctuates the series of messages of a first type with a message of a second type periodically.

21. An apparatus comprising:
    a controller configured for controlling a transmitter to transmit a series of messages of a first type outside a network of low power radio frequency transceivers, the apparatus being configured to form the network of transceivers, and configured for punctuating the series of messages of a first type with messages of a second type, transmitted within the network of transceivers, for maintaining synchronization.

22. The apparatus as claimed in claim 21 configured to operate as a master of the radio network of slave transceivers.

23. The apparatus as claimed in claim 21, wherein the network of transceivers is configured to use a first frequency hopping sequence.

24. The apparatus as claimed in claim 23 wherein the messages of a first type transmitted outside the network of transceivers are configured to be transmitted using a second frequency hopping sequence.

25. The apparatus as claimed in claim 21, wherein the messages of the second type are configured to be broadcast.

26. The apparatus as claimed in claim 21, wherein the controller is configured to punctuate the series of messages of a first type with a message of a second type periodically.

27. The apparatus as claimed in claim 21 wherein the messages of the second type are configured to not initiate a response from any of the transceivers in the network.

28. The apparatus as claimed in claim 21, wherein the messages of the second type comprise a synchronization word dependent upon the identity of the apparatus.

29. The apparatus as claimed in claim 21, wherein messages of the second type are configured to be transmitted at a frequency dependent upon the identity of the apparatus.

* * * * *